(12) United States Patent
Wei et al.

(10) Patent No.: US 9,054,586 B2
(45) Date of Patent: Jun. 9, 2015

(54) METHODS AND APPARATUS FOR CONTINUOUS AND DISCONTINUOUS ACTIVE RECTIFIER BOOST OPERATION TO INCREASE POWER CONVERTER RATING

(71) Applicants: Lixiang Wei, Mequon, WI (US); Yogesh Patel, Grafton, WI (US)

(72) Inventors: Lixiang Wei, Mequon, WI (US); Yogesh Patel, Grafton, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 113 days.

(21) Appl. No.: 13/832,295

(22) Filed: Mar. 15, 2013

(65) Prior Publication Data
US 2014/0268954 A1    Sep. 18, 2014

(51) Int. Cl.
| | |
|---|---|
| H02M 7/217 | (2006.01) |
| H02M 5/458 | (2006.01) |
| H02M 7/219 | (2006.01) |
| H02M 1/00 | (2006.01) |
| H02M 1/32 | (2007.01) |

(52) U.S. Cl.
CPC ............ H02M 7/217 (2013.01); H02M 5/4585 (2013.01); H02M 7/219 (2013.01); *H02M 2001/0022* (2013.01); *H02M 2001/327* (2013.01); *Y02B 70/1408* (2013.01)

(58) Field of Classification Search
CPC ......... H02M 5/45; H02M 5/458; H02M 7/04; H02M 7/08; H02M 7/537; H02M 7/5387; H02M 7/217

USPC .................... 363/37, 41, 44, 47, 89, 131, 132
See application file for complete search history.

(56) References Cited

U.S. PATENT DOCUMENTS

| | | | |
|---|---|---|---|
| 6,023,417 A | 2/2000 | Hava et al. | |
| 7,034,501 B1 | 4/2006 | Thunes et al. | |
| 7,102,327 B2 | 9/2006 | Ho | |
| 7,187,155 B2 | 3/2007 | Matsuo et al. | |
| 7,190,143 B2 * | 3/2007 | Wei et al. ...................... | 318/606 |
| 7,190,599 B2 | 3/2007 | Virolainen et al. | |
| 7,495,938 B2 | 2/2009 | Wu et al. | |
| 7,629,764 B2 | 12/2009 | Shoemaker et al. | |
| 7,679,310 B2 | 3/2010 | Schulz et al. | |
| 7,738,267 B1 * | 6/2010 | Tallam et al. .................. | 363/35 |

(Continued)

OTHER PUBLICATIONS

European Search Report, EP Application No. 14160231.8; completed Jun. 13, 2014; mailed Jun. 24, 2014; the Hague, 7 pgs.

(Continued)

*Primary Examiner* — Adolf Berhane
*Assistant Examiner* — Yemane Mehari
(74) *Attorney, Agent, or Firm* — Fay Sharpe LLP

(57) ABSTRACT

Power conversion systems and operating methods are presented in which an active front end rectifier is operated in a boost mode using discontinuous pulse width modulation in a first range of DC bus voltage boost amount, and continuous space vector pulse width modulation is used in a second range, with the ranges being correlated to output derating with respect to filter inductor magnetics in the first range and to rectifier switching loss derating and the second range.

20 Claims, 4 Drawing Sheets

(56) References Cited

U.S. PATENT DOCUMENTS

| | | |
|---|---|---|
| 7,759,897 B2 | 7/2010 | Piippo |
| 7,881,081 B1 | 2/2011 | Tallam et al. |
| 8,054,032 B2 | 11/2011 | Chakrabarti et al. |
| 8,107,267 B2 | 1/2012 | Tallam et al. |
| 2004/0195995 A1 | 10/2004 | Quirion et al. |
| 2005/0068001 A1 | 3/2005 | Skaug et al. |
| 2010/0165674 A1 | 7/2010 | Dai et al. |
| 2010/0172161 A1 | 7/2010 | Tallam et al. |
| 2011/0299308 A1 | 12/2011 | Cheng et al. |
| 2012/0075892 A1 | 3/2012 | Tallam et al. |
| 2012/0112674 A1 | 5/2012 | Schulz et al. |
| 2012/0140532 A1 | 6/2012 | Tallam et al. |
| 2012/0201056 A1 | 8/2012 | Wei et al. |

OTHER PUBLICATIONS

Wu et al., "Power Factor Control of a Three-Phase Boose Rectifier with Specific Power Factor Under Asymmetrical Conditions", 2005 IEEE Industry Applications Conf. $40^{th}$ IAS Annual Meeting, Oct. 2-6, 2005, Kowloon, Hong Kong, CN (IEEE Cat., vol. 1, Oct. 2, 2005, pp. 161-168.

Hava, et al., "A High Performance Generalized Discontinuous PWM Algorithm", IEEE Applied Power Electronics Conference, Feb. 1997, vol. 2, pp. 886-891, IEEE Trans. on Industry Applications Version.

* cited by examiner

METHODS AND APPARATUS FOR CONTINUOUS AND DISCONTINUOUS ACTIVE RECTIFIER BOOST OPERATION TO INCREASE POWER CONVERTER RATING

BACKGROUND

Power conversion systems are used to provide AC output power to a load, such as motor drives with an inverter stage driving an AC motor. Active front end (AFE) converters employ a pulse width modulated switching rectifier to convert input AC power and provide DC power to a bus, with the inverter switches converting the DC bus to output currents to drive the load. Such active front end converters are typically coupled with input filters, such as LCL filter circuits connected to each power phase. Since the front end rectifier is a switching circuit, the input filter operates to prevent introduction of unwanted harmonic content into the power grid or other input source. Filter components, including the filter inductors, are typically designed according to the power converter rating, where oversizing input filter components adds cost to the system and occupies valuable enclosure space. However, situations may occur in which grid voltages sag, or in which an available input source voltage is lower than the nominal AC input voltage for which the converter was designed. In certain applications, moreover, it may be desirable to operate a higher voltage motor or other load even though the source voltage is low, for instance, a 400 V input voltage to drive a 460 V motor. In these situations, the active front end rectifier can be operated in boost mode to provide additional boost to increase the gain of the front end converter, thereby boosting the DC bus voltage. At full load conditions, however, boost mode operation of the active front end rectifier leads to increased ripple and other harmonics, which can overheat the filter inductor core. One or more thermal shutoff switches may be positioned to sense the inductor temperature increase and cause a safe system shutdown. However, tripping the drive may not be desired in certain applications, and thus it is desirable to have a technique to allow the system to operate in boost mode without shutdown. In addition, such a thermal switch may be positioned some distance from the inductor core in order to sense temperature increases due to multiple causes, such as to detect whether a system blower fan is off while a full load is being driven, and thus may be unable to quickly detect overheating in the filter inductor core. Adding multiple thermal switches may address this issue, but this approach adds further cost and complexity to the system. In addition to filter inductor overheating issues, active front and rectifiers may also exhibit increased switching loss associated with operation of the rectifier switching devices in a boost mode.

For both of these reasons, operation of an active front end power conversion system in boost mode may require an overall derating of the input and output capabilities of the converter. Specifically, the maximum output current available from the power converter may need to be reduced when the active front end is operated in boost mode in order to mitigate or avoid overheating the filter inductors and/or to reduce rectifier switching losses. However, such derating may render a power conversion system unsuitable for a given application. Accordingly, there is a need for improved power converter apparatus and operating techniques to facilitate operation with an active front end in boost mode while mitigating or avoiding thermal stress to filter inductors and/or rectifier switching losses to achieve improved power ratings.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides derating techniques and active front end power converter control apparatus in which rectifier boost mode operation is performed using discontinuous pulse width modulation (DPWM) in a first range of DC bus voltage boost amount, and continuous space vector pulse width modulation (SVPWM OR SVM) is used in a second range. The crossover between the boost mode ranges is determined according to derating curves or values associated with filter inductor magnetics and rectifier switching losses of the power converter. In this manner, active front end converters can be operated with reduced derating during boost mode operation by selective employment of rectifier DPWM or SVPWM.

Power conversion system operating methods are provided in accordance with one or more aspects of the present disclosure, including operating a rectifier in boost mode, determining a filter magnetic derating value and a space vector pulse width modulation derating value at least partially according to the amount of DC bus voltage boost, and comparing the derating values. The method further involves providing rectifier switching control signals using discontinuous pulse width modulation if the filter magnetic derating value is greater than the space vector pulse width modulation derating value, and using space vector pulse width modulation for the rectifier switching if the space vector pulse width modulation derating value is greater than the filter magnetic derating value.

In certain embodiments, the method involves operating the rectifier directly or indirectly according to a derated output current value set according to the higher of the filter magnetic derating value and the space vector pulse width modulation derating value. The method can thus be employed to improve the overall power converter rating by selectively using the highest derating value in consideration of PWM type effects on rectifier switching loss as well as thermal effects related to input filter inductor core temperature.

In certain embodiments, a discontinuous pulse width modulation angle is adjusted according to the filter magnetic derating value, such as by selectively decreasing the DPWM angle as the amount of DC bus voltage boost is increased. This concept provides a hybrid DPWM/SVPWM rectifier switching control approach and may advantageously facilitate further improvement in power converter rating when the rectifier operates in boost mode.

Further aspects of the disclosure relate to non-transitory computer readable mediums with computer executable instructions for implementing the power conversion system operating methods.

Power conversion systems and controllers are provided in accordance with further aspects of the present disclosure, including an active rectifier and a controller that provides rectifier switching controls to operate in a boost mode using DPWM in a first range of the DC bus voltage boost amount, and using SVPWM in a higher second range.

In certain embodiments, the controller determines a filter magnetic derating value and a space vector pulse width modulation derating value at least partially according to the DC bus voltage boost amount, and employs DPWM rectifier control in the first range where the filter magnetic derating value is higher than the space vector pulse width modulation derating value, or employs SVPWM in the second range for which the space vector pulse width modulation derating value is above the filter magnetic derating value.

The controller in certain embodiments provides rectifier switching control signals according to the higher of the filter magnetic derating value and the space vector pulse width modulation derating value, and may selectively adjust a DPWM angle according to the filter magnetic derating value, for example, by selectively decreasing the DPWM angle with increasing DC bus voltage boost amount in the first range.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
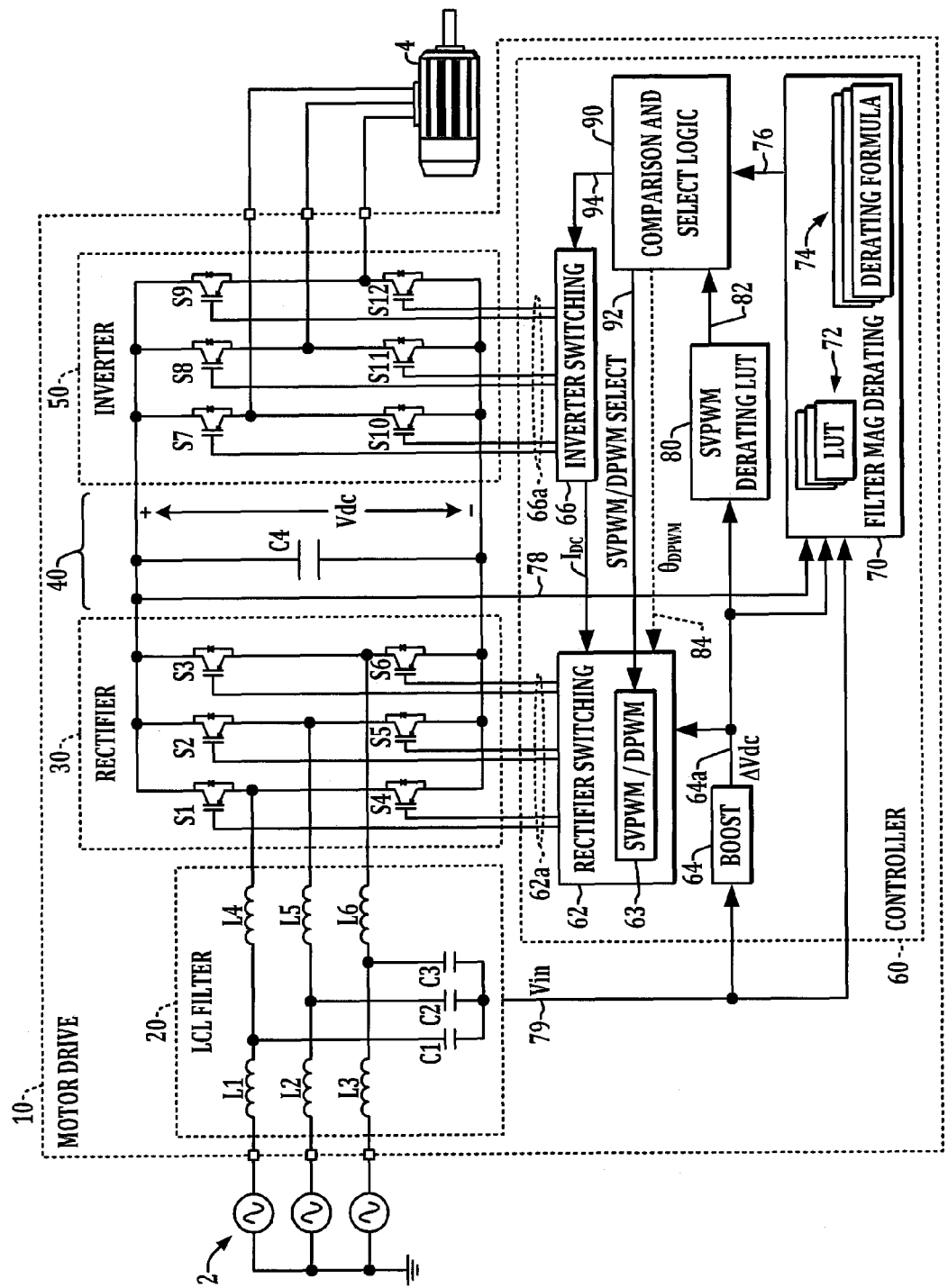
FIG. 1 is a schematic diagram illustrating an exemplary motor drive power converter with selective SVPWM/DPWM active front end boost mode operation and improved derating control to protect input filter inductors and to mitigate excessive rectifier switching losses while achieving improved rectifier output rating in accordance with one or more aspects of the present disclosure.

Referring now to the figures, several embodiments or implementations are hereinafter described in conjunction with the drawings, wherein like reference numerals are used to refer to like elements throughout, and wherein the various features are not necessarily drawn to scale. Power converters and associated operating methodologies are presented hereinafter for boost mode operation of an active front end, in which different pulse width modulation approaches are used for different amounts of DC bus voltage boost. While these concepts are illustrated and described in the context of AC motor drives, they may be employed with other forms of power conversion systems having an active front end converter driving a DC load, wherein the present disclosure is not limited to the illustrated examples.

FIG. 1 illustrates an exemplary motor drive power conversion system 10 receiving single or multiphase AC input power from an external power source 2. The illustrated example receives a three phase input, but other multiphase embodiments are possible. The motor drive 10 includes an input filter circuit 20, in this case a three phase LCL filter having grid side inductors L1, L2 and L3 connected to the power leads of the power source 2 as well as series connected converter side inductors L4, L5 and L6, with filter capacitors C1, C2 and C3 connected between the corresponding grid and converter side inductors and a common connection node, which may but need not be connected to a system ground. Although illustrated in the context of a three phase LCL filter circuit 20, other alternate circuit configurations can be used, including without limitation LC filters.

The motor drive 10 includes an input filter circuit 20, a rectifier 30, a DC bus or DC link circuit 40 and an output inverter 50, with the rectifier 30 and the inverter 50 being operated by a controller 60. The controller 60 includes a rectifier controller 62 with an associated boost logic circuit 64 and includes a component 63 for selectively providing SVPWM or DPWM operation in a boost mode. An inverter controller 66 is provided along with various derating circuitry 70, 80 and 90 for selective derating of the motor drive 10 by controlling or limiting the maximum rectifier output current provided to the inverter 50 as described further hereinafter. In the illustrated example, the derating control components provide a derated output current value 94 to the inverter switching controller 66, which in turn provides a DC current command value $I_{DC}$ to the rectifier switching controller 62 in order to operate the rectifier 30 at a derated output current level. In other possible implementations, the derating components provide a derated output current value 94 directly to the rectifier switching controller 62, and the disclosed concepts can be employed in active front end power conversion systems that do not include an output inverter 50, but instead provide a DC output from the rectifier 30 to drive an external load, such as a battery charging system, solar panel systems, fuel cells, etc.

In the system of FIG. 1, an LCL or filter magnetics derating control component 70 of the controller 60 employs one or more lookup tables (LUTs) 72 and/or one or more derating formulas 74 to generate a filter magnetics derating value or amount 76 which may be selectively employed to directly or indirectly derate the rectifier output current when the rectifier 30 is operated in boost mode. Also, the drive controller 60 includes a SVPWM derating lookup table (LUT) or other derating component 80 providing a SVPWM derating value or amount 82. These values 76 and 82 are compared via a comparison and select logic component or circuit 90 which provides a SVPWM/DPWM select signal 92 to a rectifier switching controller 62 and provides a derated output current value 94 to an inverter switching controller 66 or directly provides a derated output current value 94 to the rectifier controller 62. In certain embodiments, for example, the comparison and select logic 90 provides the derated output current value 94 to controller 66 (or directly to controller 62) as the higher of the filter magnetic derating value 76 and the space vector pulse width modulation derating value 82. The inverter switching controller 66, in turn, provides inverter switching control signals 66a to operate the output inverter 50 according to the derated output current value 94, and provides the DC current command signal or value $I_{DC}$ to the rectifier controller 62 according to the derated output current value 94. In practice, the derating values 76, 82 and 94 are less than or equal to the maximum output current rating for the rectifier 30, and operation of the rectifier switching control component 62 provides for controlled operation of the load driven by the rectifier output at or below the derating value in order to mitigate or avoid thermal stress to the filter inductors L and to also mitigate or avoid excessive switching loss associated with operation of rectifier switching devices S1-S6.

The controller 60 and the components thereof may be implemented as any suitable hardware, processor-executed software, processor-executed firmware, logic, and/or combinations thereof wherein the illustrated controller 60 can be implemented largely in processor-executed software or firmware providing various control functions by which the controller 60 receives feedback and/or input signals and/or values (e.g., setpoint(s)) and provides rectifier and inverter switching control signals 62a and 66a to operate the rectifier switching devices S1-S6 and switches S7-S12 of the inverter 50 to convert input power for providing AC output power to drive the load 4. In addition, the controller 60 and the components thereof can be implemented in a single processor-based device, such as a microprocessor, microcontroller, FPGA, etc., or one or more of these can be separately implemented in unitary or distributed fashion by two or more processor devices.

The motor drive 10 implements an active front end (AFE) including a switching rectifier (also referred to as a converter) 30 receiving three-phase power from the source 2 through the filter circuit 20. The rectifier 30 includes rectifier switches S1-S6, which may be insulated gate bipolar transistors (IGBTs) or other suitable form of semiconductor-based switching devices operable according to a corresponding rectifier switching control signal 62a to selectively conduct current when actuated. In addition, as seen in FIG. 1, diodes are connected across the individual IGBTs S1-S6. Operation of the rectifier switches S1-S6 is controlled according to pulse width modulated rectifier switching control signals 62a to provide active rectification of the AC input power from the source 2 to provide a DC bus voltage Vdc across a DC bus capacitance C4 in a DC link circuit 40. In other embodiments, the rectifier 30 provides a DC output to drive an external load (not shown), and the inverter 50 and corresponding controller 66 may be omitted. The rectifier 30, moreover, can be selectively operated by the rectifier switching control component 62 for normal operation or boost mode operation according to boost control logic 64. In boost operation, the rectifier switching control component 62 provides the signals 62a to cause the rectifier 30 to generate the DC bus voltage at a level above the peak line to line AC input voltage received from the input source 2. In addition, the rectifier controller 62 provides boost mode operation according to a DC bus voltage boost amount 64a from the boost component 64, and selectively employs either continuous space vector pulse width modulation (SVPWM) or discontinuous pulse width modulation (DPWM) via the component 63 according to a pulse width modulation select signal 92 from the comparison and select logic 90.

The inverter switches S7-S12 are coupled to receive power from the DC bus 40 and to provide AC output power to the motor or other load 4. The switches S7-S12 are operated according to switching control signals 66a from the inverter switching control component 66, and can be any form of suitable high-speed switching devices, including without limitation IGBTs. The inverter controller 66 also provides a DC current command signal or value $I_{DC}$ to the rectifier switching controller 62 to cause the rectifier controller 62 to operate the rectifier switches S1-S6 to provide a DC output current to the DC link circuit 40 accordingly. In addition, the controller 60 receives various input signals or values, including setpoint signals or values for desired output operation, such as motor speed, position, torque, etc., as well as feedback signals or values representing operational values of various portions of the motor drive 10. Among these are a DC bus voltage feedback signal or value 78 representing the DC bus voltage Vdc, and a signal or value 79 representing the line to line AC input voltage value.

Boost mode operation of the active front end rectifier 30 may arise under a variety of circumstances. For instance, a motor drive 10 may be designed for an output current (or horsepower) rating based on receipt of AC input power at a certain nominal voltage level or range, such as 480 V AC in one example. In certain embodiments, the controller 60 employs the boost control component 64 to selectively switch the rectifier switching control component 64 from normal to boost operation, and provides an additional DC bus voltage boost amount required to operate the inverter motor (e.g., the DC bus voltage boost amount) 64a ($\Delta$Vdc) to the derating components 70 and 80 as well as to the rectifier switching controller 62. In certain implementations, moreover, the boost amount 64a may be preprogrammed into the controller 60, or may be user configurable. For example, the motor drive 10 may be designed for a certain AC input voltage value or range (e.g., 480 V, 60 Hz), but may be installed for use in an environment providing only 380 V AC input. In such a situation, the controller 60 may be programmed with a fixed DC voltage boost value 64a for use by the rectifier switching controller 62 and the derating system 70, 80, 90.

The inventors have appreciated that increased harmonic content in boost mode leads to increased operating temperature of the inductor cores of the filter circuit inductors L4-L6. In particular, the converter side inductors L4-L6 may suffer thermal stress caused by boost operation of the active front end rectifier 30. In this regard, motor drives and other active front end power conversion systems 10 are typically designed around a nominal rating condition, including rated AC input voltage levels and corresponding DC bus voltages and currents, as well as drive output power or current levels. In order to economize a design with respect to cost, heat and cabinet space, the input filter inductors L are typically designed around the nominal rating condition, and thus switching operation to boost mode may cause excessive thermal stress to the inductors L as the increased harmonics heat up the core structure. As noted above, thermal shutoff switches can be used to attempt to detect overheating of inductor cores, but extensive sensor coverage is both expensive and adds to the complexity of the motor drive system 10. Moreover, many situations arise in practice for which it is desirable to operate a power converter 10 with the rectifier boosting the DC bus voltage beyond the peak line AC input voltage value. Simply providing thermal shutdown capability may protect the filter inductors L from thermal stress, but may generate undesirable system shutdowns. Another approach to address this issue is to design the filter inductors L to accommodate the higher harmonic content associated with boost mode operation, but this requires increasing the size and cost of the input filter circuit 20 and the components thereof.

In addition, the inventors have appreciated that increasing the switching frequency of the rectifier 30 may advantageously reduce thermal stress on the inductors L. For example, changing the rectifier switching frequency from 2 kHz to 4 kHz may mitigate inductor core thermal issues to a certain extent. However, the increased switching frequency results in higher switching loss associated with the rectifier switching devices S1-S6. The inventors have appreciated that this switching loss increase can be characterized by a derating value, which may be a function of the amount of DC bus voltage boost. In addition, the inventors have further appreciated that discontinuous pulse width modulation (DPWM) can be used to alleviate the switching loss increase attendant with switching frequency increase.

The present disclosure advantageously employs DPWM over a portion of a voltage boost range, and selectively switches to SVPWM for higher boost amounts, thereby providing potentially optimal rectifier output current rating during rectifier voltage boost operation. This, in turn, allows a given motor drive or other power conversion system 10 to be used with minimal output derating penalty in situations in which available AC input voltages may not match the AC input voltage rating of the drive 10. For instance, a motor drive designed for 480 V three-phase AC input voltages may be successfully employed in situations in which 380 V AC input is available, with the active front end operated in boost mode, and the disclosed control apparatus and techniques allowing the drive 10 to operate at the highest possible output rating without thermally stressing input filter inductors and without incurring excessive rectifier switching loss penalties. The present disclosure thus provides intelligent balancing of derating values computed or otherwise determined according to different operating conditions in the power conversion system 10, in this case, a filter magnetic derating value 76 characterizing the safe operating point with respect to thermal stress on the inductor core structures, as well as a pulse width modulation derating value 82 determined according to rectifier switching losses. As a result, improved power converter performance is achieved beyond that attainable using conventional drive rating and operating techniques and controllers.

The controller 60 can be operated in boost mode with the rectifier controller 62 providing the switching control signal 62a such that the resulting DC bus voltage Vdc across the DC link capacitor C4 is higher than the peak line to line AC input voltage. During boost mode operation, moreover, in various implementations, the motor drive 10 can be configured to always operate in boost mode, such as in the above mentioned situations in which the AC input voltage is expected to be lower than the nominal input voltage for which the drive 10 was designed or rated. In alternate implementations, the boost control component 64 may automatically switch in and out of boost mode based on a measured AC input voltage value Vin using a feedback signal or value 79 from the input filter circuit 20, or the boost control state may be selectively modified by an input signal received from an external source (not shown), or combinations of the above. In the illustrated example, moreover, the boost control component 64 provides the DC voltage boost amount output value 64a representing a voltage above a nominal rated DC bus voltage that the rectifier switching controller 62 will regulate. In this regard, the DC voltage boost amount 64a in the illustrated embodiment is in units of volts DC, and represents the amount of voltage above the peak line to line AC input voltage currently present in the system 10, although other implementations are possible.

The rectifier switching controller 62 in the illustrated example operates in non-boost mode at a relatively high switching frequency to ameliorate filter inductor thermal issues, such as about 4 kHz in one example. In addition, the rectifier controller 62 uses discontinuous pulse width modulation (DPWM) in order to reduce the amount of switching loss in the rectifier switches S1-S6. In the boost mode, in this example, the controller 60 continues to employ DPWM in operating the rectifier switching controller 62. However, in order to address the increased filter magnetic thermal susceptibility which increases as a function of the DC voltage boost amount 64a, the controller 60 advantageously uses DPWM only for a first range of boost operation (range 204 in FIG. 3 below). For operation at a second range corresponding to even higher DC voltage boost amounts (range 206 in FIG. 3), the rectifier control switches to continuous SVPWM operation based on a SVPWM/DPWM signal 92 from the comparison and select logic 90. In boost operation, therefore, the controller 60 provides a dual mode pulse width modulation technique that can be advantageously used to balance filter magnetic thermal issues and rectifier switching loss. In particular embodiments, as described further below, the switchover from DPWM rectifier operation to SVPWM is strategically determined according to the relative values of a filter magnetic derating value 76 and a space vector pulse width modulation derating value 82.

In this regard, the controller 60 also advantageously adjusts an output current derating value 94 used in operating the inverter switching controller 66 and hence in operating the rectifier controller 62 according to the higher of the SVPWM derating value 82 and the filter magnetics derating value 76. In this manner, the rating of the motor drive 10 selectively modified such that the rectifier DC output current does not exceed the selected derating value 94, thereby protecting the filter inductors L from thermal stress and also protecting the rectifier switches S1-S6 from excessive switching loss. Thus, the selective derating via the selected value 94 advantageously minimizes the derating impact, thereby rendering the drive 10 applicable to a wider range of field installation situations.

Using these novel techniques, moreover, the filter inductors L and the rectifier switches S1-S6 need not be oversized, and the system can operate intermittently or even continuously in rectifier boost mode without triggering undesirable shutdowns. Moreover, the disclosed concepts facilitate use of motor drives and other power conversion systems 10 in applications characterized by varying or continuously low AC input voltages, with selective boost mode operation being employed to allow use of a converter 10 designed or optimized for operation at a higher input voltage level. Also, the concepts of the present disclosure allow such use without unnecessarily sacrificing output rating other than that derating appropriate to adequately protect the filter inductors L and the rectifier switches S1-S6. Thus, the converter controller 60 provides an intelligent balancing of the interrelationship between design considerations for the power converter 10 and specific field applications requiring boost mode operation, which balance was not possible using conventional control approaches.

Figure 3:
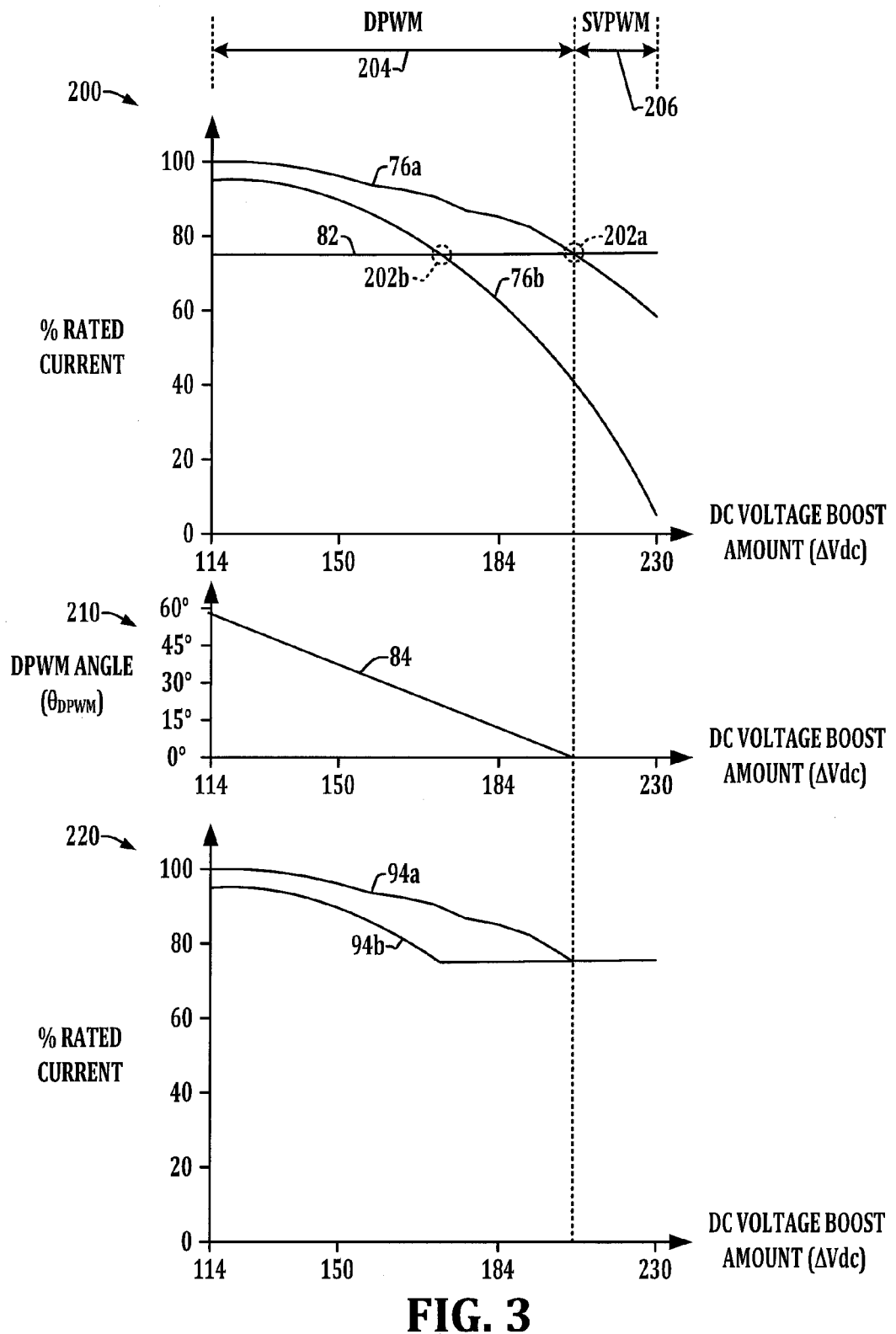
FIG. 3 illustrates filter magnetic and space vector pulse width modulation derating curves, a controlled DPWM angle adjustment curve and overall drive derating curves associated with the power converter of FIG. 1.

The filter magnetics derating amount 76 is determined in the illustrated embodiments according to the AC input voltage Vin present at the source 2 (or the AC input voltage level at other measure points in the LCL filter circuit 20) based on one or more feedback signals or values 79, and also according to the DC bus voltage (feedback signal or value 78) and the amount of DC bus voltage boost 64a (ΔVdc) obtained from the boost control component 64. In certain embodiments, the filter magnetic derating value 76 can be represented as a percentage of the nominal rectifier output current rating or of an overall drive output current rating. In practice, moreover, the filter magnetic derating value 76 is less than or equal to the maximum output current rating for the rectifier 30, and typically varies as a function of the DC bus voltage boost amount 64a, as seen in FIG. 3 below. In this regard, the filter magnetic derating value 76 and the corresponding DC bus voltage boost amount 64a correspond in certain embodiments to a maximum steady state load operating condition of the power converter 10 for which at least one input filter inductor L is designed not to overheat. As seen in FIG. 1, the controller 60 may include one or more filter magnetic derating lookup tables 72 and/or derating formulas 74 individually corresponding to a given AC input value 79, for use in determining a filter magnetic derating value 76 according to the amount of DC bus voltage boost 64a.

The space vector pulse width modulation derating value 82 is also less than or equal to the maximum steady state rectifier output current rating, and may, but need not, vary with the DC bus voltage boost amount 64a. In the illustrated embodiment, the space vector pulse width modulation derating value 82 is determined by the derating unit 80 according to the DC bus voltage boost amount 64a. In practice, as seen in FIG. 3 below, the derating value 82 may be generally constant, such as about 80% in certain implementations. Moreover, the SVPWM derating value 82 may change if the rectifier switching controller 62 operates at a different switching frequency, with the derating value 82 generally increasing with decreasing rectifier switching frequency. In addition, the SVPWM derating value 82 and the corresponding DC bus voltage boost amount 64a in certain embodiments correspond to a maximum steady state load operating condition of the power converter 10 or of the rectifier 30 itself, for which the switching loss of the rectifier switches S1-S6 is within an acceptable design limit, for example, that which prevents thermal degradation of the switches S1-S6. In practice, the SVPWM derating component 80 may include a simple lookup table indexed as a function of DC bus voltage boost amount 64a to provide a corresponding SVPWM derating value 82. Moreover, a lookup table may not be needed in certain implementations, with the derating value 82 being essentially constant for a given rectifier switching frequency.

Figure 2:
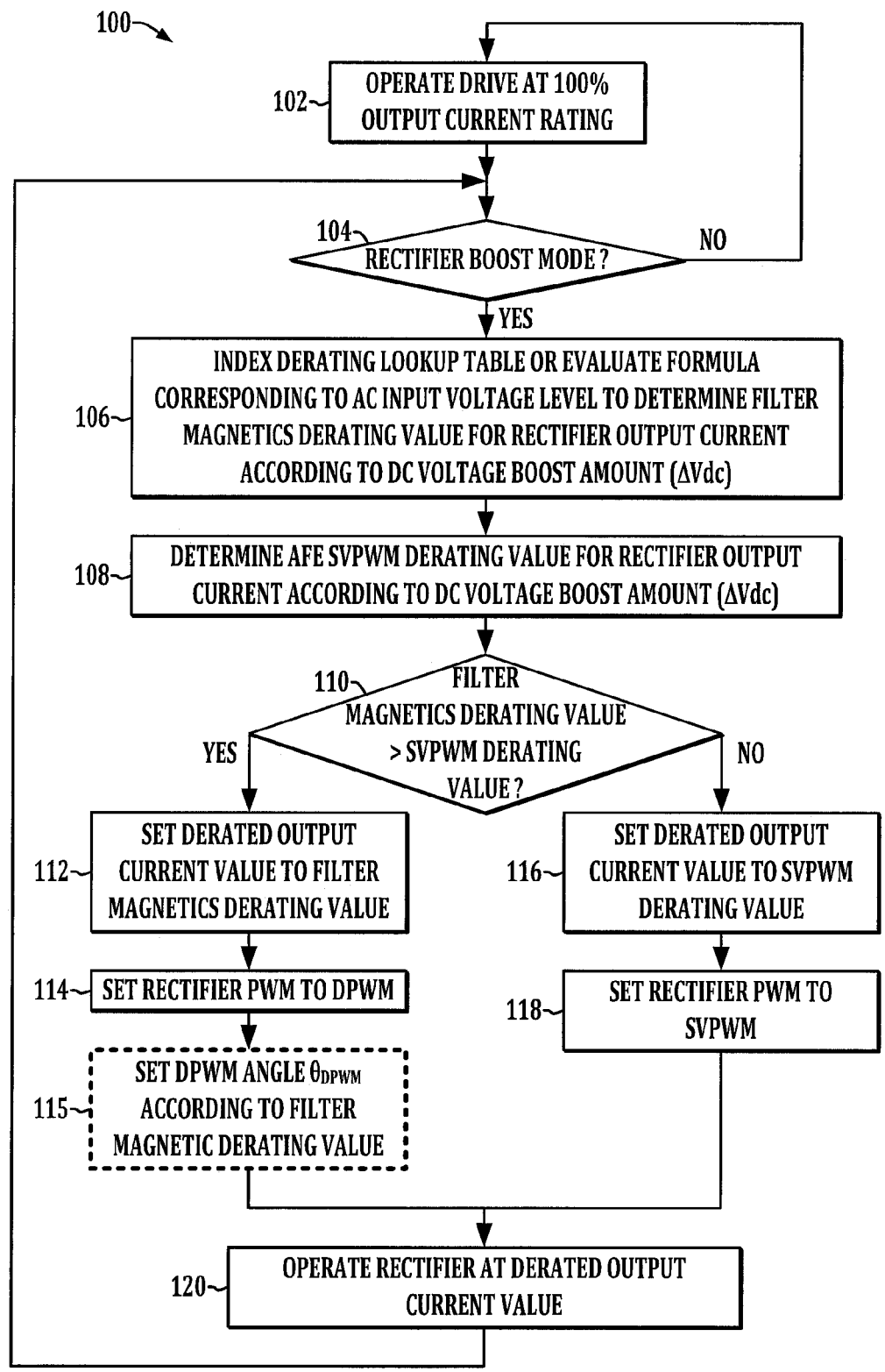
FIG. 2 is a flow diagram illustrating an exemplary power converter operating method using selective rectifier operation in either SVPWM or DPWM mode as well as intelligent rectifier current output derating during active front end rectifier boost mode operation.

Referring also to FIG. 2, a method 100 is illustrated for operating a power conversion system, which may be employed in the motor drive 10 of FIG. 1 or in any other power conversion system. While the method 100 is illustrated and described below in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated method 100 other methods of the disclosure may be implemented in hardware, processor-executed software, or combinations thereof, such as in the exemplary motor drive controller 60 described above, and may be embodied in the form of computer executable instructions stored in a tangible, non-transitory computer readable medium, such as in a memory operatively associated with the controller 60 in one example.

The drive 10 or the rectifier 30 thereof may be operated with a normal 100% output current rating as shown at 102 in FIG. 2. In certain implementations, the normal (non-boost) operation at 102 can be done using any suitable form of pulse width modulation for the rectifier 30, such as discontinuous PWM, continuous pulse width modulation, etc. In the system 10 of FIG. 1, for example, the rectifier switching controller 62 may operate in normal mode and in a first range of boost mode using DPWM (range 204 in FIG. 3). A determination is made at 104 in FIG. 2 as to whether the rectifier 30 is operating in boost mode. For example, the boost control component 64 may provide a non-zero DC bus voltage boost amount value 64a based on a current sample of the input voltage 79, or based on some external signal in certain embodiments, indicating that the rectifier is to be operated in voltage boost mode. If the rectifier 30 is not in boost mode (NO at 104), the drive 10 continues to be operated at the normal output current rating at 102.

If the rectifier is in boost mode (YES at 104), the controller 60 determines a filter magnetics derating value (e.g., value 76 in FIG. 1 above) according to the line to line AC input voltage value (e.g., from feedback signal or value 79) and according to the DC bus voltage boost amount 64a from the boost control component 64 (ΔVdc). In certain embodiments, the voltage boost amount 64a is expressed in terms of volts DC, although not a strict requirement. For instance, if the nominal DC voltage (e.g., approximately the peak line to line AC input voltage value) is 560 V DC, boost mode operation to provide a DC bus voltage of 680 V DC would represent a 120 V DC bus voltage boost amount 64a (ΔVdc=120 V DC). Other suitable representation schemes can be employed by which a DC bus voltage boost amount is used which in some way represents the effect of boost mode operation on the DC bus voltage Vdc.

The determination at 106 of the filter magnetics derating value 76 can be performed in a variety of ways. In one possible embodiment, a lookup table can be used (e.g., lookup table 72 in FIG. 1), with the derating value 76 being obtained from a lookup table 72 corresponding to the line to line AC input voltage value. This can be accomplished, for instance, by indexing the lookup table 72 which corresponds to the AC input voltage level in order to determine the filter magnetics derating value 76 associated with the DC voltage boost amount 64a ΔVdc. In another possible embodiment, a derating formula 74 (FIG. 1) may be solved at 106 corresponding to the AC input voltage level to determine the filter magnetics derating value 76 according to the DC voltage boost amount ΔVdc 64a.

At 108 in FIG. 2, a pulse width modulation derating value (value 82 in FIG. 1) is determined for the drive output current according to the DC bus voltage boost amount 64a. In one example, the SVPWM derating value 82 is determined using a derating lookup table 80 according to the boost amount 64a, but other embodiments are possible in which the SVPWM derating value 82 is generally constant.

A determination is then made at 110 as to whether the filter magnetics derating value 76 is greater than the SVPWM derating value 82. If so (YES at 110), a derated output current value (94 in FIG. 1) is set at 112 to the filter magnetics derating value 76, and the rectifier switching controller 62 is operated at 114 using discontinuous pulse width modulation (DPWM). In addition, as shown in FIG. 2, the controller 60 may optionally set a DPWM angle (84 or $\theta_{DPWM}$ in FIG. 1 above) at 115 according to the filter magnetics derating value 76. In certain embodiments, the DPWM angle 84 is adjusted at 115 by reducing the angle 84 with increasing DC bus voltage boost amount 64a (e.g., see curve 84 in the graph 210 of FIG. 3 below). The drive output inverter 50, and hence the rectifier 30, is then operated at 120 in FIG. 2 according to the derated output current value 94. If the space vector pulse width modulation derating value 84 is greater than the filter magnetics derating value 76 (NO at 110), the process 100 of FIG. 2 instead sets the derated output current value 94 to the SVPWM derating value 82 at 116, and switches the rectifier pulse width modulation mode to continuous space vector modulation (SVPWM) at 118, with the inverter and hence the rectifier being operated at 120 according to the derated output current value 94. The process 100 then repeats as described above to again verify whether the rectifier is to continue boost mode operation at 104.

The process 100 thus provides rectifier PWM switching control signals 62a to the rectifier 30 using DPWM if the filter magnetics derating value 76 is greater than the SVPWM derating value 82, and provides the switching control signals 62a using SVPWM if the space vector pulse width modulation derating value is greater than the filter magnetics derating value 76. In addition, the controller 60 further provides controlled derating of the rectifier output current by setting the derated output current value 94 to the higher of the filter magnetics derating value 76 and the space vector pulse width modulation derating value 82, and by using this derated output current value 94 to operate the rectifier 30. For example, the motor drive 10 and the inverter 50 and rectifier 30 thereof may receive one or more setpoint values representing a desired load drive condition, such as a setpoint torque, speed, position, etc. The inverter controller 66 in certain embodiments uses the output current derating value 94 as a maximum limit on the output current provided to the motor load 4, and provides the DC current command value $I_{DC}$ to the rectifier switching controller 62 to operate the rectifier 30 according to the derating value 94. Thus, the rectifier 30 will provide DC output current such that the derating value 94 is not exceeded, thereby ensuring that the filter inductors L are not thermally stressed and excessive rectifier switching losses are avoided are mitigated.

Figure 4:
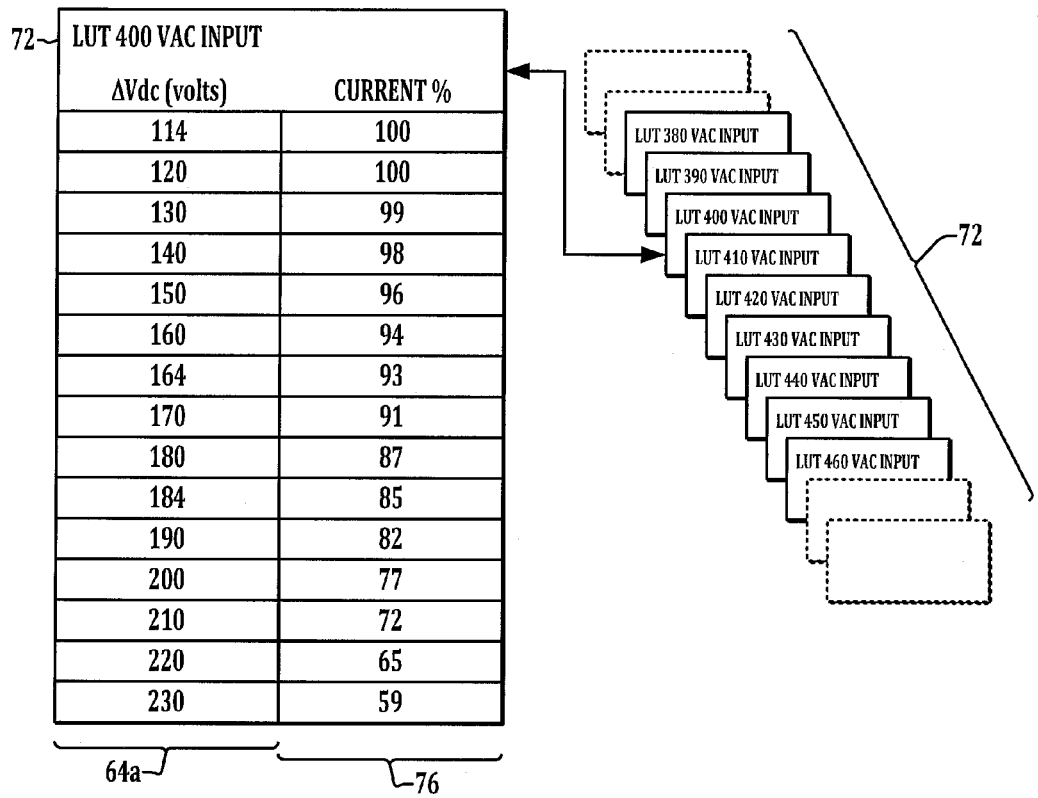
FIG. 4 illustrates an exemplary filter magnetic derating lookup table for selectively derating the rectifier output current according to DC voltage boost.

Referring also to FIGS. 3 and 4, FIG. 3 shows a graph 200 depicting first and second filter magnetics derating curves 76a and 76b representing a percent rated current versus DC voltage boost amount 64a for a 400 V AC line to line input voltage level. The graph 200 further illustrates an exemplary space vector pulse width modulation derating curve or value 82 (e.g., approximately 76% in this example). In addition, the graph 200 also shows two exemplary crossover points 202a and 202b at which a corresponding one of the filter magnetics derating values 76a and 76b cross the SVPWM derating value 82.

FIG. 3 also illustrates a graph 210 showing an exemplary adjustment curve for the DPWM angle 84 as a function of DC voltage boost amount, and a pair of overall output current derating value curves 94 are illustrated in a graph 220 of FIG. 3.

FIG. 4 illustrates an exemplary lookup table 72 corresponding to the filter magnetics derating curve 76a in FIG. 3. The table 72 in FIG. 4 in this example is chosen from a plurality of such tables 72, with each table 72 being associated with a particular AC input voltage value. As seen in the curve 76a in FIG. 3, when the DC bus voltage is 114 V above normal, the rectifier output current rating is 100% (e.g., the filter magnetics derating value 76 is equal to the maximum output current rating for the power converter 10 as a whole or the rectifier 30 thereof). In this case, the curve 76 represents maximum steady state load conditions for which the filter inductors L will not be thermally stressed, and thus boosting the DC bus voltage by 114 volts will allow the filter inductors L to avoid overheating even if the motor drive 10 is fully loaded. However, as the DC bus voltage boost amount 64a increases to 160 V and 184 V, the filter magnetics derating value 76 drops to approximately 93% and 85%, respectively. At these levels, therefor, controlling the rectifier 30 to provide no more than this derated amount of output current allows the filter inductors L to continue operation within the proper thermal range. In certain embodiments, a formula 74 (FIG. 1) can be used to evaluate the filter magnetics derating curve 76 for any given DC bus voltage boost amount 84a, for example, a polynomial function.

Moreover, the curve 76a in FIG. 3 and a corresponding lookup table 72 in FIG. 4 correspond to a particular line to line AC input voltage value, where one or more such parametric functions 74 and/or lookup tables 72 may be provided. Thus, for instance, the filter magnetics derating system 70 in FIG. 1 may be configured to select an appropriate (e.g., closest) function 74 or lookup table 72 based on the line to line AC input voltage present in the system 10 (e.g., according to the input voltage feedback signal or value 79), and to use that function or lookup table to determine the filter magnetics derating value 76 according to the AC input line voltage value and according to the DC bus voltage boost amount 64a. Moreover, as seen in FIG. 4, certain embodiments may employ different lookup tables 72 for various AC input voltage levels, such as 380 V, 390 V, 400 V, etc. Likewise, the filter magnetics derating system 70 may employ one of a plurality of derating formulas 74, each corresponding to a different AC input voltage level, with the derating system 70 selecting a closest or most appropriate formula 74 according to the feedback 79. In one possible embodiment, the filter magnetics derating system 70 is configured to dynamically receive the input voltage feedback signal or value 79 and choose the closest lookup table 72 for use in determining the filter magnetics derating value 76. Similarly, the filter magnetics derating system 70 may select from among a plurality of derating formulas 74 based on the AC input value 79.

When using a selected lookup table 72, moreover, the filter magnetics derating system 70 may utilize interpolation for the derated output current value determination. As seen in FIG. 4, for instance, the controller 60 may interpolate between filter magnetics derating values 76 of the lookup table 72 corresponding to DC bus voltage boost amounts 64a above and below the DC bus voltage boost amount present in the power system 10 to derive the filter magnetics derating value 76 for use in operating the rectifier 30. For example, if the DC bus voltage boost amount 64a in the example of FIG. 4 is 175 V DC (ΔVdc=175), the controller 60 could use any suitable interpolation technique (e.g., linear or otherwise) with the corresponding filter magnetics derating values (e.g., 91% and 87%) corresponding to the DC bus voltage boost amounts (e.g., 170 V DC and 180 V DC) above and below the actual voltage boost in order to derive or compute the value 76 through interpolation (e.g., 89% in this example).

In certain implementations, the values of the lookup table 72 and the parameters of the derating formulas 74 can be selected such that they correspond to maximum steady state load operating conditions of the power converter 10 for which the input filter inductor (e.g., L) is designed not to overheat. This correlation can be obtained by any suitable means, such as by empirical testing to derive rectifier output current derating values 76 for a number of different DC bus voltage boost value 64a at which the temperature of the inductor core is at the rated value (or within an acceptable range thereof), and constructing a corresponding table 72 for each of a number of AC input voltage values. Likewise, experimental data can be used to derive formulas 74 (e.g., linear, polynomial, etc.) based on curve fitting or other suitable mathematical technique.

As seen in FIG. 3, the first illustrated filter magnetic derating curve 76a is higher than the SVPWM derating value 82 in a first range of 204 of the boost mode operation, and the curves 76a and 82 cross at a point 202a. With increasing DC bus voltage boost amounts after the crossover 202a, the SVPWM derating value 82 is higher than the filter magnetic derating value curve 76a in a second (upper) DC bus voltage boost range 206. At the transition 202a, the comparison and select logic 90 (FIG. 1) provides the SVPWM/DPWM select signal 92 to the rectifier switching controller 62 for changeover by the SVPWM/DPWM component 63 to SVPWM operation of the rectifier 30. Thus, the comparison and select logic 90 provides for DPWM rectifier operation in the first range 204, and thereafter switches the rectifier to SVPWM control in the second range 206 based on the relative derating values 76 and 82. Moreover, the comparison and select logic 90 provides the derating value 94 to the inverter switching controller 66, and hence to the rectifier controller 62, to provide the rectifier switching control signals 62a to the switching devices S1-S6 to cause the rectifier 30 to generate DC output currents according to the higher of the filter magnetic derating value 76 and the SVPWM derating value 82. As seen in the lower graph 220 of FIG. 3, the comparison and select logic 90 thus provides a composite derating curve 94a for this example which facilitates maximization of the overall motor drive rating (minimizes the derating impact on the rectifier 30) in consideration of both the filter magnetic derating and SVPWM derating factors.

The graphs 200 and 220 in FIG. 3 also illustrate another example, in this case using larger filter inductors L with an associated filter magnetic derating value curve 76b which crosses over the SVPWM derating value curve 82 at 202b. The graph 220 in FIG. 3 also illustrates a corresponding composite derating curve 94b to which the rectifier 30 is operated, which is the higher of the filter magnetic derating curve 76b and the SVPWM derating curve 82.

Figure 5:
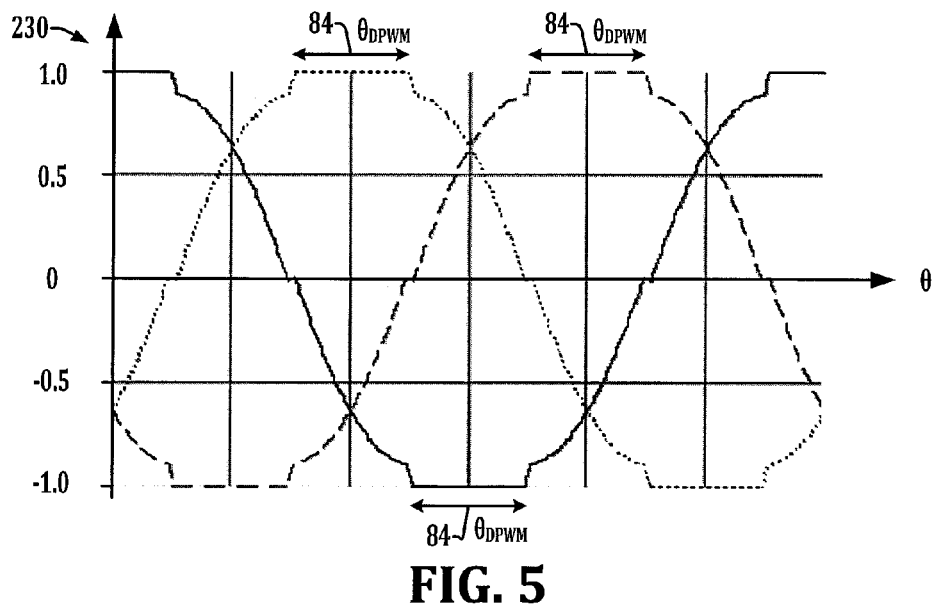
FIG. 5 is a graph showing portions of exemplary carrier waveforms implementing discontinuous pulse width modulation and a corresponding adjustable DPWM angle during boost mode operation of the power converter of FIG. 1.

Referring also to FIG. 5, FIG. 3 further illustrates a graph 210 showing operation of certain embodiments of the controller 60 in which a hybrid DPWM and SVPWM technique is provided by the controller 60. FIG. 5 illustrates an exemplary graph 230 showing three-phase carrier waveforms employing discontinuous pulse width modulation which clamps the carrier at the maximal or minimal levels (e.g., +1.0 and −1.0 in this example) over an angular range constituting the DPWM angle 84 ($\theta_{DPWM}$). In this implementation, the DPWM angle 84 is provided by the comparison and select logic 90 to the rectifier switching controller 62 for use in the discontinuous pulse width modulation operation of the rectifier 30 in the first boost mode range 204 (FIG. 3). In addition, the comparison and select logic 90 selectively adjusts the DPWM angle 84 based on the filter magnetics derating value 76. In addition, as seen in the graph 210 of FIG. 3, the comparison and select logic 90 in this embodiment selectively decreases the DPWM angle 84 with increasing DC bus voltage boost amounts 64a in the first range 204, in this case, a linear decrease from 60° to 0°, reaching 0° at the crossover location 202a at which the control changes over to continuous space vector pulse width modulation for the upper range 206. Other adjustment profiles and curves may be used, including curvilinear, stepped adjustments, etc. In addition, the AFE rectifier rating reduction can be synchronized with the filter magnetic reduction in boost mode by this technique.

In accordance with further aspects of the present disclosure, a non-transitory computer readable medium is provided, such as a computer memory, a memory within a power converter control system (e.g., controller 100), a CD-ROM, floppy disk, flash drive, database, server, computer, etc.), which includes computer executable instructions for performing the above-described methods. The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method for operating a power conversion system, the method comprising:
   operating a rectifier of the power conversion system in a boost mode to provide a DC bus voltage at a DC bus higher than a peak line to line AC input voltage value;
   determining a filter magnetic derating value according to a line to line AC input voltage value and according to a DC bus voltage boost amount, the filter magnetic derating value being less than or equal to a maximum output current rating for the rectifier;
   determining a space vector pulse width modulation derating value according to the DC bus voltage boost amount, the space vector pulse width modulation derating value being less than or equal to the maximum output current rating for the rectifier;
   comparing the filter magnetic derating value to the space vector pulse width modulation derating value;
   providing pulse width modulated rectifier switching control signals to at least one switching device of the rectifier using discontinuous pulse width modulation if the filter magnetic derating value is greater than the space vector pulse width modulation derating value; and
   providing pulse width modulated rectifier switching control signals to the at least one switching device of the rectifier using space vector pulse width modulation if the space vector pulse width modulation derating value is greater than the filter magnetic derating value.

2. The method of claim 1, comprising:
   setting a derated output current value to the higher of the filter magnetic derating value and the space vector pulse width modulation derating value; and
   operating the rectifier according to the derated output current value.

3. The method of claim 2, further comprising:
   adjusting a discontinuous pulse width modulation angle according to the filter magnetic derating value during discontinuous pulse width mode operation if the filter magnetic derating value is greater than the space vector pulse width modulation derating value.

4. The method of claim 3, wherein the discontinuous pulse width modulation angle is selectively decreased with increasing DC bus voltage boost amount.

5. The method of claim 4, wherein determining the filter magnetic derating value comprises:
   obtaining the derated output current value corresponding to the DC bus voltage boost amount from a lookup table corresponding to the line to line AC input voltage value.

6. The method of claim 4, wherein determining the filter magnetic derating value comprises:
   solving at least one derating formula according to the DC bus voltage boost amount.

7. The method of claim 2:
   wherein the filter magnetic derating value and the corresponding DC bus voltage boost amount correspond to a maximum load operating condition of the power conversion system for which at least one input filter inductor of the power conversion system is designed not to overheat; and wherein the space vector pulse width modulation derating value and the corresponding DC bus voltage boost amount correspond to a maximum load operating condition of the power conversion system for which a switching loss of the at least one switching device of the rectifier is within an acceptable design limit.

8. The method of claim 1, further comprising:
adjusting a discontinuous pulse width modulation angle according to the filter magnetic derating value during discontinuous pulse width mode operation if the filter magnetic derating value is greater than the space vector pulse width modulation derating value.

9. The method of claim 8, wherein the discontinuous pulse width modulation angle is selectively decreased with increasing DC bus voltage boost amount.

10. The method of claim 1:
wherein the filter magnetic derating value and the corresponding DC bus voltage boost amount correspond to a maximum steady state load operating condition of the power conversion system for which at least one input filter inductor of the power conversion system is designed not to overheat; and
wherein the space vector pulse width modulation derating value and the corresponding DC bus voltage boost amount correspond to a maximum steady state load operating condition of the power conversion system for which a switching loss of the at least one switching device of the rectifier is within an acceptable design limit.

11. A non-transitory computer readable medium with computer executable instructions for operating a power conversion system, the computer readable medium comprising computer executable instructions for:
operating a rectifier of the power conversion system in a boost mode to provide a DC bus voltage at a DC bus higher than a peak line to line AC input voltage value;
determining a filter magnetic derating value according to a line to line AC input voltage value and according to a DC bus voltage boost amount, the filter magnetic derating value being less than or equal to a maximum output current rating for the rectifier;
determining a space vector pulse width modulation derating value according to the DC bus voltage boost amount, the space vector pulse width modulation derating value being less than or equal to the maximum output current rating for the rectifier;
comparing the filter magnetic derating value to the space vector pulse width modulation derating value;
providing pulse width modulated rectifier switching control signals to at least one switching device of the rectifier using discontinuous pulse width modulation if the filter magnetic derating value is greater than the space vector pulse width modulation derating value; and
providing pulse width modulated rectifier switching control signals to the at least one switching device of the rectifier using space vector pulse width modulation if the space vector pulse width modulation derating value is greater than the filter magnetic derating value.

12. The computer readable medium of claim 11, comprising computer executable instructions for:
setting a derated output current value to the higher of the filter magnetic derating value and the space vector pulse width modulation derating value; and
operating the rectifier according to the derated output current value.

13. The computer readable medium of claim 11, comprising computer executable instructions for:
adjusting a discontinuous pulse width modulation angle according to the filter magnetic derating value during discontinuous pulse width mode operation if the filter magnetic derating value is greater than the space vector pulse width modulation derating value.

14. A power conversion system, comprising:
an active rectifier comprising a plurality of rectifier switching devices coupled to receive AC input power from an external power source and to provide a DC bus voltage at a DC bus; and
a controller providing pulse width modulated rectifier control signals to the rectifier switching devices to selectively operate the rectifier in a boost mode to provide the DC bus voltage higher than a peak line to line AC input voltage value, the controller selectively providing the rectifier control signals using discontinuous pulse width modulation for a first range of a DC bus voltage boost amount, and providing rectifier control signals using space vector pulse width modulation for a second range of the DC bus voltage boost amount, wherein the second range is higher than the first range.

15. The power conversion system of claim 14, wherein the controller is operative to:
determine a filter magnetic derating value according to a line to line AC input voltage value and according to the DC bus voltage boost amount, the filter magnetic derating value being less than or equal to a maximum output current rating for the rectifier;
determine a space vector pulse width modulation derating value according to the DC bus voltage boost amount, the space vector pulse width modulation derating value being less than or equal to the maximum output current rating for the rectifier;
provide the pulse width modulated rectifier switching control signals to the rectifier switching device using discontinuous pulse width modulation in the first range for which the filter magnetic derating value is greater than the space vector pulse width modulation derating value; and
provide pulse width modulated rectifier switching control signals to the rectifier switching device using continuous space vector pulse width modulation in the second range for which the space vector pulse width modulation derating value is greater than the filter magnetic derating value.

16. The power conversion system of claim 15, wherein the controller is operative to provide the rectifier switching control signals to the rectifier switching devices according to the higher of the filter magnetic derating value and the space vector pulse width modulation derating value.

17. The power conversion system of claim 16, wherein the controller is operative to adjust a discontinuous pulse width modulation angle according to the filter magnetic derating value.

18. The power conversion system of claim 15, wherein the controller is operative to adjust a discontinuous pulse width modulation angle according to the filter magnetic derating value.

19. The power conversion system of claim 15:
wherein the filter magnetic derating value and the corresponding DC bus voltage boost amount correspond to a maximum steady state load operating condition of the rectifier for which at least one input filter inductor of the power conversion system is designed not to overheat; and wherein the space vector pulse width modulation derating value and the corresponding DC bus voltage boost amount correspond to a maximum steady state load operating condition of the rectifier for which a switching loss of the at least one switching device of the rectifier is within an acceptable design limit.

20. The power conversion system of claim 14, wherein the controller is operative to selectively decrease a discontinuous pulse width modulation angle with increasing DC bus voltage boost amount in the first range.

\* \* \* \* \*